United States Patent
Mi et al.

(10) Patent No.: US 8,259,442 B2
(45) Date of Patent: Sep. 4, 2012

(54) COMPUTER BEZEL

(75) Inventors: Qing-Hui Mi, Shenzhen (CN);
Hsuan-Tsung Chen, Taipei Hsien (TW);
Guang-Yao Lee, Taipei Hsien (TW);
Gang Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 231 days.

(21) Appl. No.: 12/870,629

(22) Filed: Aug. 27, 2010

(65) Prior Publication Data
US 2011/0249393 A1    Oct. 13, 2011

(30) Foreign Application Priority Data
Apr. 13, 2010 (CN) .......................... 2010 1 0144979

(51) Int. Cl.
*G06F 1/16* (2006.01)
(52) U.S. Cl. ................................. 361/679.39; 312/223.2
(58) Field of Classification Search ............. 361/679.01, 361/679.39
See application file for complete search history.

(56) References Cited

U.S. PATENT DOCUMENTS

| | | | | |
|---|---|---|---|---|
| 6,130,822 A * | 10/2000 | Della Fiora et al. | .......... | 361/724 |
| 6,134,116 A * | 10/2000 | Hoss et al. | ................... | 361/747 |
| 6,452,788 B1 * | 9/2002 | Crowley | ................ | 361/679.37 |
| 7,208,686 B1 * | 4/2007 | Chen et al. | ................... | 174/561 |
| 7,679,897 B2 * | 3/2010 | Xu et al. | ................ | 361/679.37 |
| 7,712,627 B2 * | 5/2010 | Yang et al. | ................... | 220/830 |
| 7,916,466 B2 * | 3/2011 | Cheng et al. | .............. | 361/679.4 |
| 2005/0264989 A1 * | 12/2005 | Chen et al. | ................... | 361/683 |
| 2006/0245159 A1 * | 11/2006 | Lin et al. | ....................... | 361/685 |
| 2007/0153470 A1 * | 7/2007 | Chen et al. | ................... | 361/685 |
| 2009/0323290 A1 * | 12/2009 | Li et al. | ........................ | 361/724 |

* cited by examiner

*Primary Examiner* — Lisa Lea Edmonds
(74) *Attorney, Agent, or Firm* — Altis Law Group, Inc.

(57) ABSTRACT

A computer bezel includes a main body, a door secured to the main body, a pushing member slidably secured to the main body, and a driving member rotatably secured to the main body. The main body defines a through opening. The door is rotated between a closed position, where the door covers the through opening, and an open position, where the door is rotated away from the main body to expose the through opening. The pushing member is slid between a first position, where the pushing member is disengaged from the driving member, and a second position, where the pushing member rotates the driving member. When the driving member is slid from the first position to the second position, the driving member is capable of sliding a tray of a disk drive out of the disk drive, and the door will rotate from the closed position to the open position.

17 Claims, 6 Drawing Sheets

COMPUTER BEZEL

BACKGROUND

1. Technical Field

The present disclosure relates to a computer bezel with a door for a compact disc read-only memory (CD-ROM) drive.

2. Description of Related Art

In a computer system, a computer bezel is provided to decorate the computer system. A tray of a CD-ROM drive is often slid out of the CD-ROM drive and passes through the computer bezel. So, a computer bezel that allows the tray of CD-ROM drive to easily pass through is needed, therefore there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
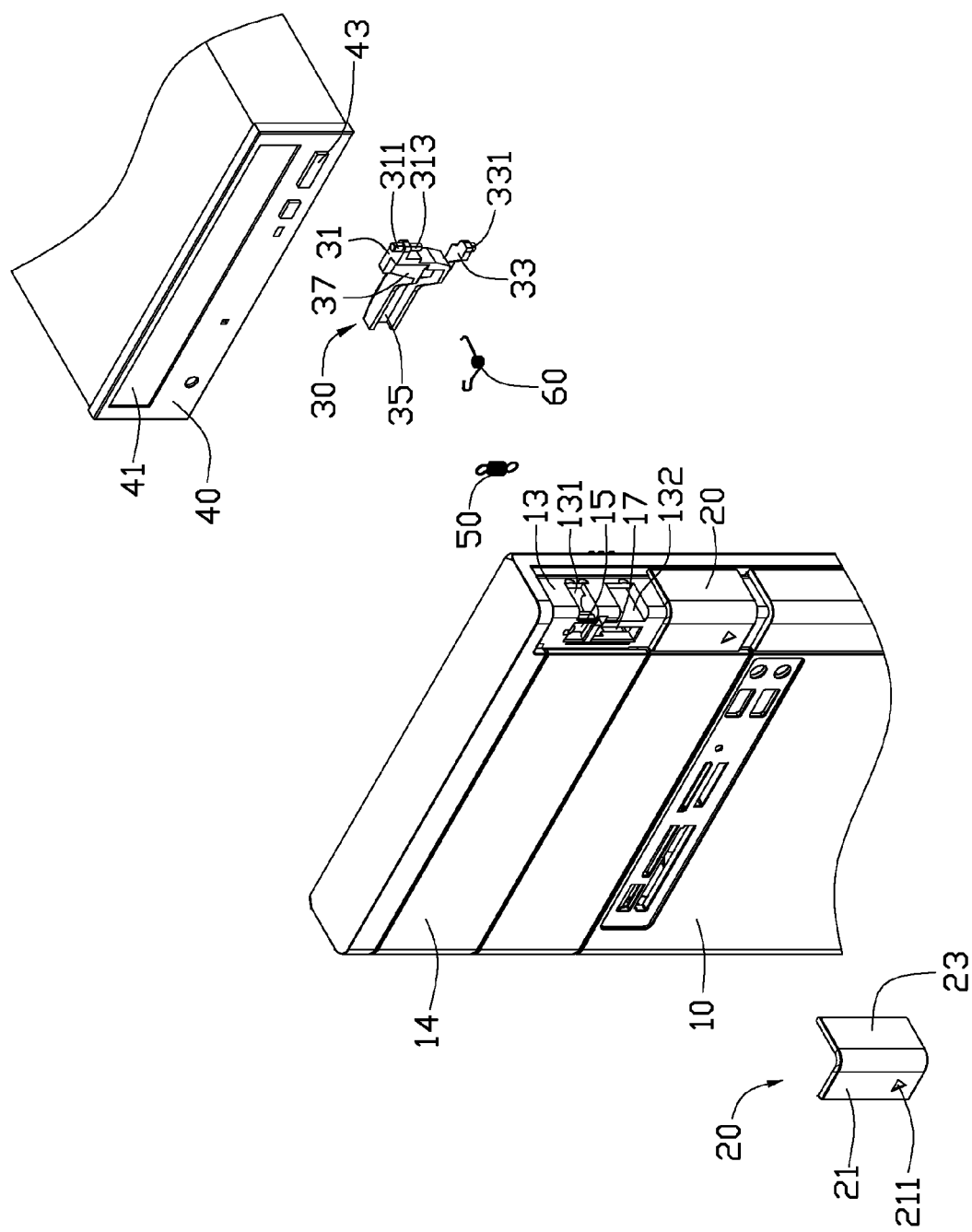
FIG. 1 is a cutaway, exploded view of a computer bezel, and a disk drive in accordance with an embodiment.

Referring to FIG. 1, a computer bezel in accordance with an embodiment includes a main body 10, a door 14, a pushing member 20, and a driving member 30.

Figure 3:
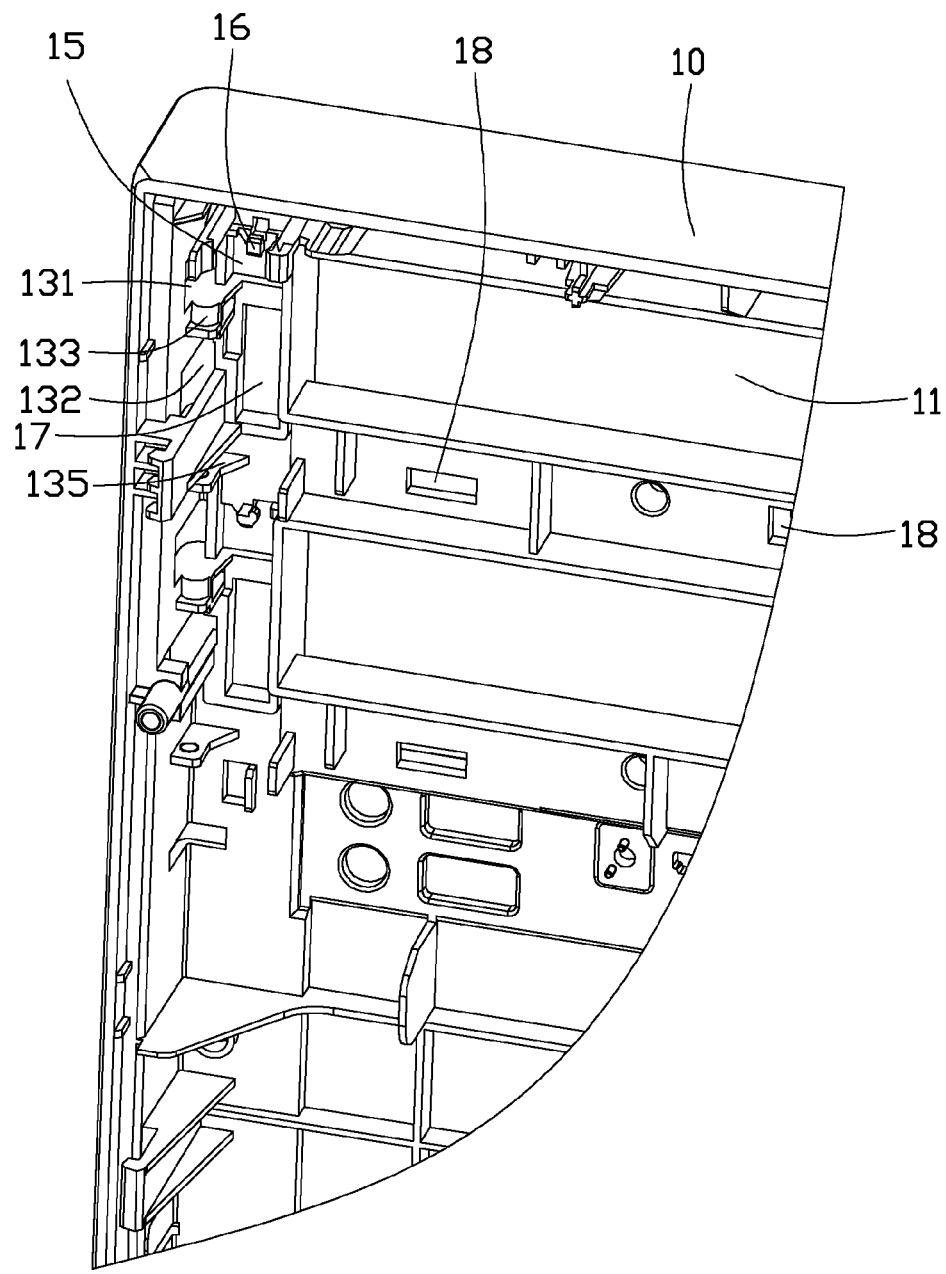
FIG. 3 is a cutaway, isometric view of a main body of FIG. 2.
Figure 6:
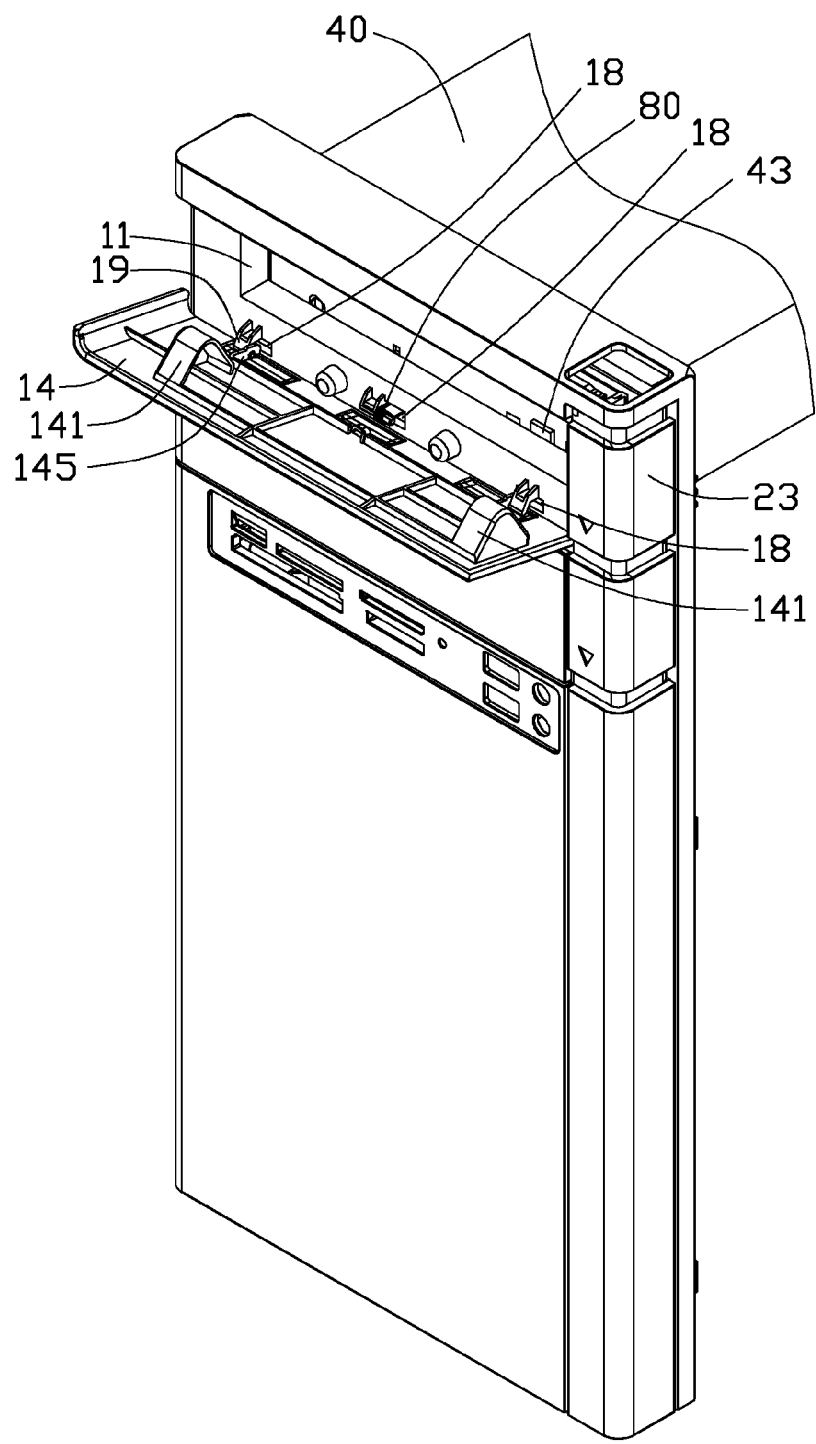
FIG. 6 is similar to FIG. 5, but showing the door in an open position.

Referring to FIGS. 1 and 3, the main body 10 defines a through opening 11, a first positioning hole 15, a second positioning hole 17, a first positioning slot 131, and a second positioning slot 132. The first and second positioning holes 15 and 17 are positioned between the through opening 11 and the first and second positioning slots 131, 132. The first positioning hole 15 is above the second positioning hole 17, and the first positioning slot 131 is above the second positioning slot 132. A hook 16 is disposed on an inner surface of the main body 10 at a top edge of the first positioning hole 15. A first positioning portion 133 and a second positioning portion 135 are located on the inner surface of the main body 10. The first positioning portion 133 is positioned between the first and second positioning holes 15 and 17, and the second positioning portion 135 is below the second positioning hole 17. A first pivot hole (not shown) is defined in the first positioning portion 133, and a second pivot hole (not labeled) is defined in the second positioning portion 135. Referring to FIG. 6, three through holes 18 are defined in the main body 10 below the through opening 11. A retaining portion 19 with a shaft (not labeled) is located on an outer surface of the main body 10 at one side of each through hole 18, below the through opening 11. In an embodiment, the through opening 11 and the through holes 18 are substantially rectangular.

Referring to FIG. 6, the door 14 is configured for covering the through opening 11. Two directing portions 141 are disposed on the door 14. Two retaining tabs 145, each with a pivot hole (not labeled), are located on the door 14. The pivot holes of the two retaining tabs 145 receive two shafts of the corresponding two retaining portions 19, so the door 14 is rotatably secured to the main body 10. A first spring member 80 is disposed on the shaft of one retaining portion 19, with one end abutting the door 14 and another end engaged in corresponding one through hole 18. The door 14 can be rotated between a closed position (shown in FIG. 1) and an open position (shown in FIG. 6) by pushing the directing portions 141. In the closed position, the door 14 covers the through opening 11, and the first spring member 80 is in an original state. In the open position, the door 14 is rotated away from the main body 10 to expose the through opening 11, and first spring member 80 is resiliently deformed. In one embodiment, a slanted surface (not labeled) is disposed on each directing portion 141, and the door 14 is rotated from the open position to the closed position when the slanted surface is pushed. In addition, the tray 41 of a disk drive 40, which will be described below, is omitted in FIG. 6 to clearly show the structure of the door 14 and the first spring member 80.

Figure 2:
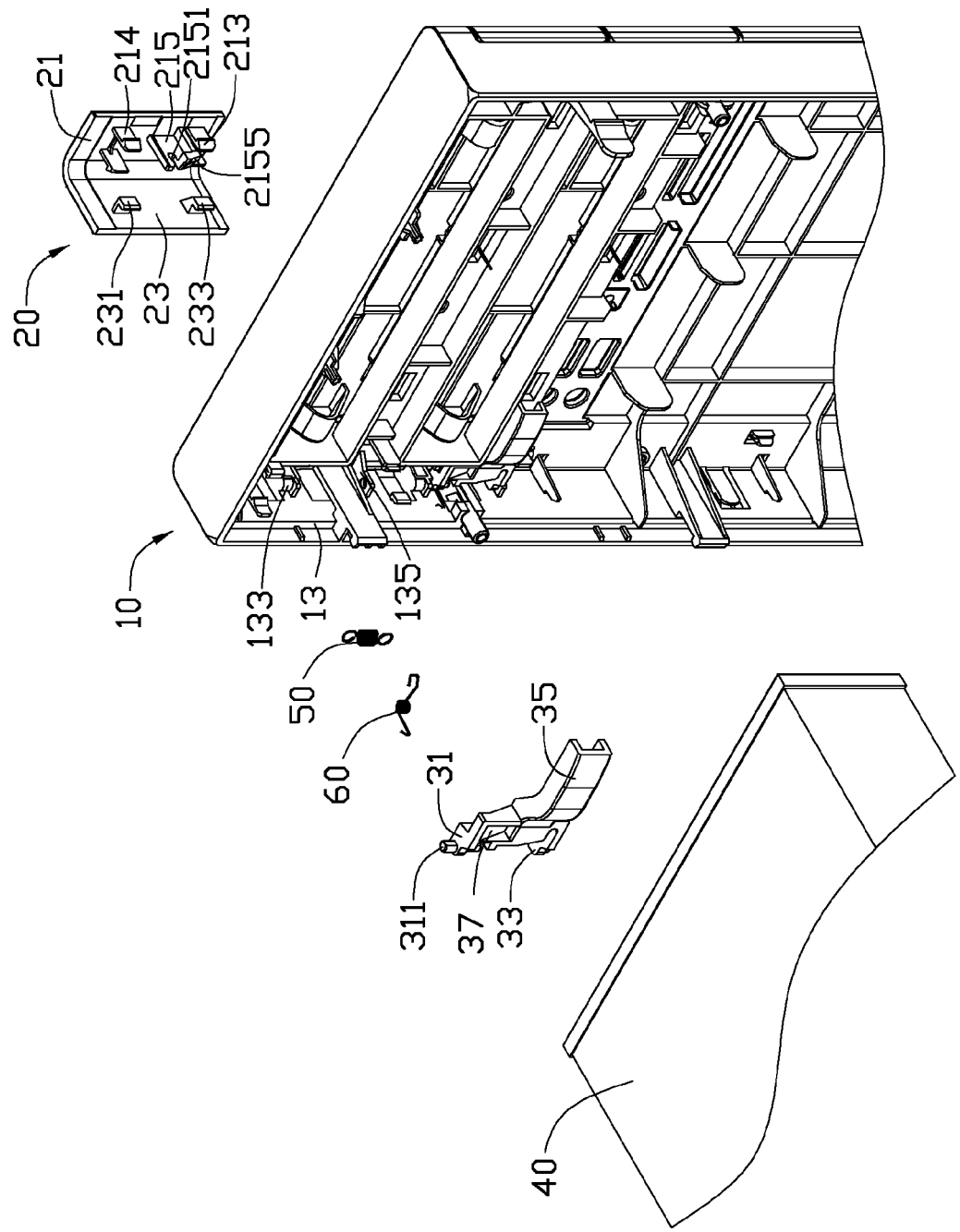
FIG. 2 is similar to FIG. 1, but viewed in different aspect.

Referring to FIG. 2, the pushing member 20 includes a first plate 21 and a second plate 23 connected to the first plate 21. A pair of first latch portions 214 and a pair of second latch portions 213 are located on the first plate 21. The first latch portions 214 are configured for engaging with opposite edges of the first positioning hole 15, and the second latch portions 213 are configured for engaging with opposite edges of the second positioning hole 17. A positioning block 215 is located on the first plate 21 between the pair of first latch portions 214 and the pair of second latch portions 213. A receiving slot 2151 is defined in the positioning block 215, and a pushing tab 2155 is disposed on the positioning block 215. A first locking portion 231 and a second locking portion 233 are located on the second plate 23. The first locking portion 231 is configured for engaging with an edge of the first positioning slot 131, and the second locking portion 233 is configured for engaging with an edge of the second positioning slot 132. In one embodiment, the first plate 21 is substantially perpendicular to the second plate 23.

Referring to FIGS. 1-2, a first positioning arm 31 and a second positioning arm 33 are located on the driving member 30. A first positioning post 311 is located on the first positioning arm 31, for engaging in the first pivot hole of the first positioning portion 133. A retaining post 313 is located on the first positioning arm 31, opposite to the first positioning post 311. A second positioning post 331 is located on the second positioning arm 33, for engaging in the second pivot hole of the second positioning portion 135. A pushing arm 35 is located on the driving member 30. A slanted portion 37 is disposed on the driving member 30, and the driving member 30 is rotated when the slanted portion 37 is pushed.

Figure 4:
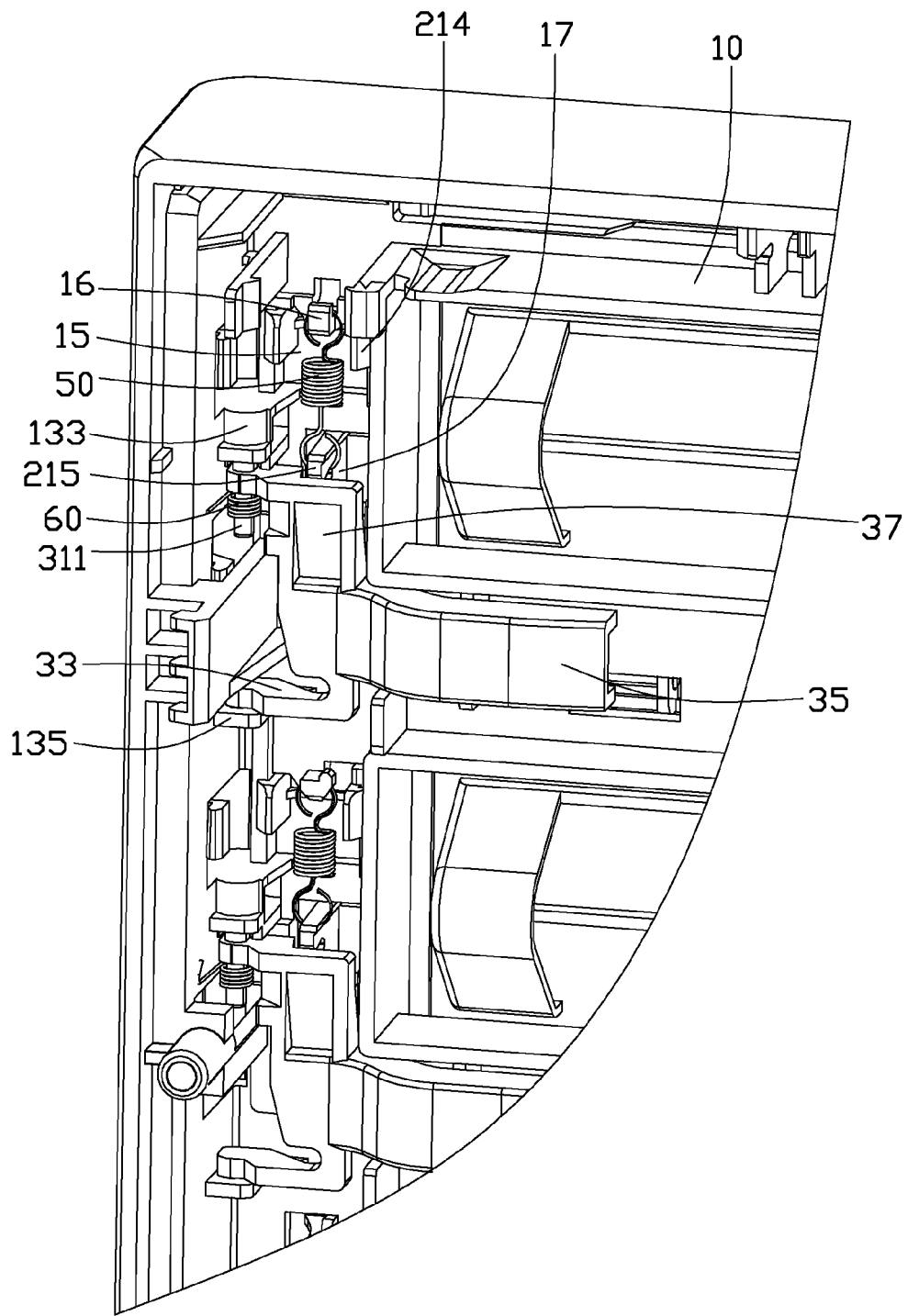
FIG. 4 is a cutaway, assembled view of the computer bezel of FIG. 2.

Referring to FIG. 4, in assembly, the pushing member 20 is placed on the outer surface of the main body 10. The pair of first latch portions 214 of the pushing member 20 engage with opposite edges of the first positioning hole 15, and the pair of second latch portions 213 engage with opposite edges of the second positioning hole 17. The first locking portion 231 engages with the corresponding edge of the first positioning slot 131, and the second locking portion 233 engages with the corresponding edge of the second positioning slot 132. Thus, the pushing member 20 is secured to the main body 10 and can be slid relative to the main body 10.

The driving member 30 is placed on the inner surface of the main body 10, and the slanted portion 37 faces the inner surface. The first positioning post 311 is engaged in the first pivot hole of the first positioning portion 133. The second positioning post 331 is engaged in the second pivot hole of the second positioning portion 135. Therefore, the driving member 30 is rotatably secured to the main body 10.

One end of a second spring member 50 engages with the hook 16, and the other end is received in the receiving slot 2151 of the positioning block 215. A third spring member 60 is disposed on the retaining post 313 of the driving member 30, with one end abutting the main body 10 and the other end abutting the driving member 30.

The pushing member 20 can be slid between a first position and a second position. In the first position, the pushing tab 2155 is disengaged from the slanted portion 37, and the second spring member 50 is in an original state. In the second position, the pushing tab 2155 pushes with the slanted portion 37 to rotate the pushing arm 35 of the driving member 30 away from the inner surface of the main body 10, and the third spring member 60 is resiliently deformed.

Figure 5:
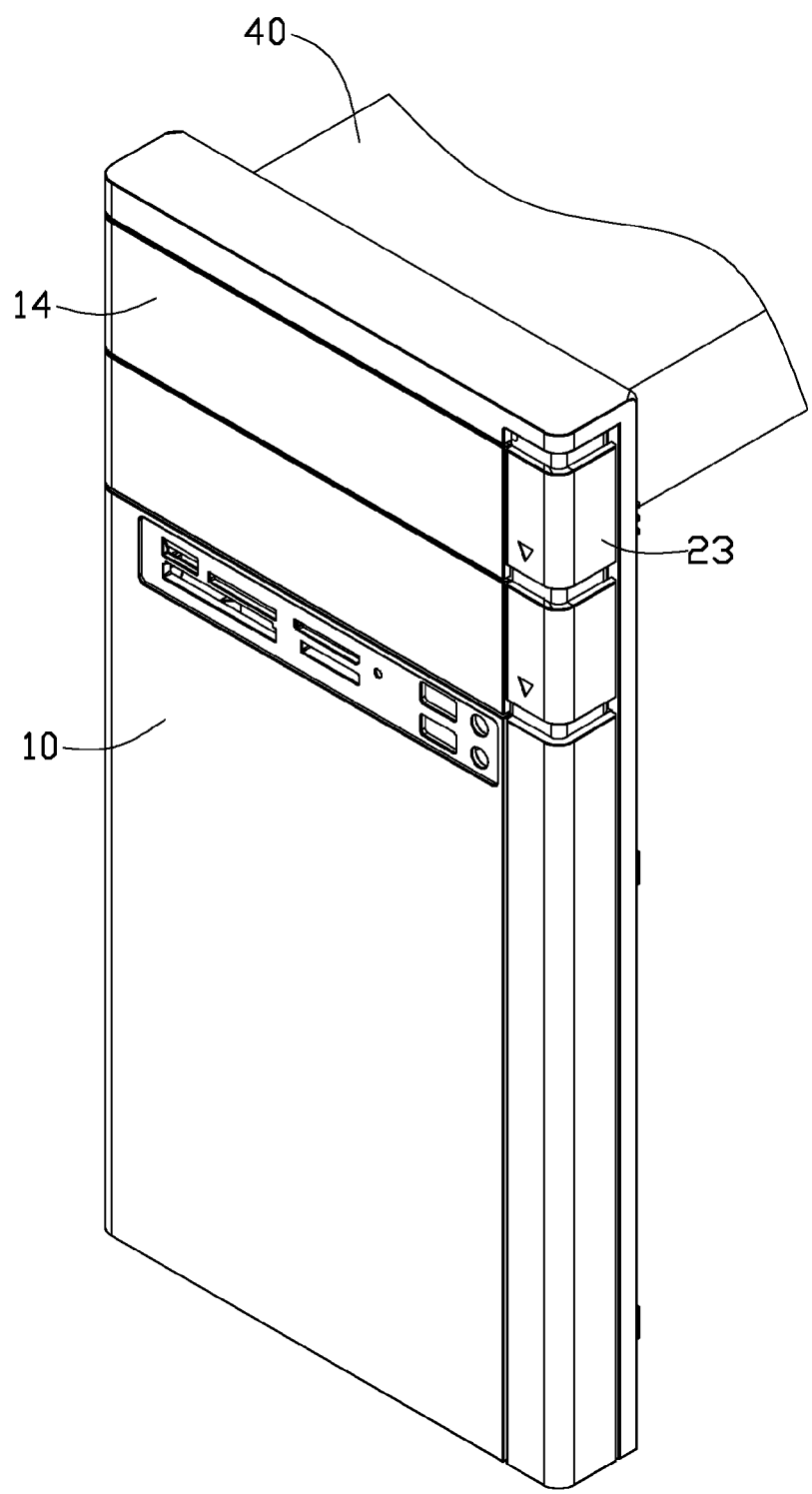
FIG. 5 is an assembled view of the computer bezel and the disk drive of FIG. 1, showing a door in a closed position.

Referring to FIG. 5, the computer bezel can be secured to a chassis of a computer system (not shown). The disk drive 40 is secured to the chassis, and may be a compact disc read-only memory (CD-ROM), or other data storage device. Referring to FIG. 1, the disk drive 40 includes a tray 41, for holding a disk. The tray 41 can pass through the through opening 11 of the main body 10 of the computer bezel. A button 43 is disposed on the disk drive 40 below the tray 41. The tray 41 can be slid out of the disk drive 40 when the button 43 is pressed, and slid in the disk drive 40 when the button 43 is pressed again. After the disk drive 40 is installed in the chassis, the button 43 abuts the pushing arm 35 of the driving member 30 when the pushing member 20 is in the first position.

Referring to FIGS. 1 and 6, in use, when a disk is needed to be placed in the tray 41 of the disk drive 40, the pushing member 20 is slid from the first position to the second position. The pushing tab 2155 of the pushing member 20 is slid to push the slanted portion 37 of the driving member 30, thereby rotating the pushing arm 35 to press the button 43. The tray 41 is slid out of the disk drive 40, to push the directing portions 141. Therefore, the door 14 is rotated from the closed position to the open position. The through opening 11 is exposed, and the tray 41 is slid out of the main body 10.

When the tray 41 is slid out of the main body 10, the pushing member 20 is released. The pushing member 20 is slid from the second position to the first position, due to rebound of the second spring member 50. The pushing tab 2155 is disengaged from the slanted portion 37 of the driving member 30. The driving member 30 is thus rotated back to release the button 43 because the third spring member 60 rebounds.

After the disk is placed in the tray 41, the pushing member 20 is pushed to slide from the first position to the second position. The driving member 30 is rotated to press the button 43. Therefore, the tray 41 is slid in the disk drive 40, and the door 14 is rotated from the open position to the closed position because the first spring member 80 rebounds.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer bezel comprising:
   a main body defining a through opening;
   a door rotatably secured to the main body; and the door rotates between a closed position, where the door covers the through opening, and an open position, where the door is rotated away from the main body to expose the through opening;
   a pushing member slidably secured to the main body; and
   a driving member rotatably secured to the main body;
   wherein the pushing member is slid between a first position, where the pushing member is disengaged from the driving member, and a second position, where the driving member is rotated by the pushing member; when the driving member is slid from the first position to the second position, the driving member is capable of sliding a tray of a disk drive out of the disk drive, and the door will rotate from the closed position to the open position.

2. The computer bezel of claim 1, wherein a first spring member is located between the door and the main body; and the first spring member is in a first original state when the door is in the closed position, and in a first deformed state when the door is in the open position.

3. The computer bezel of claim 1, wherein the pushing member comprises a first plate and a second plate located on the first plate; a latch portion is located on the first plate, and a locking portion is located on the second plate; and a position hole is defined in the main body to slidably receive the latch portion, and a positioning slot is defined in the main body to slidably receive the locking portion.

4. The computer bezel of claim 3, wherein the first plate is substantially perpendicular to the second plate.

5. The computer bezel of claim 1, wherein a second spring member is located between the pushing member and the main body; and the second spring member is in a second original state, when the pushing member is in the first position, and in a second deformed state, when the pushing member is in the second position.

6. The computer bezel of claim 1, wherein a pushing tab is located on the pushing member; a slanted portion is located on the driving member; and the pushing tab is disengaged from the slanted portion when the pushing member is in the first position, and the pushing tab engages with the slanted portion when the pushing member is in the second position.

7. The computer bezel of claim 1, wherein a third spring member is located between the driving member and the main body; and the third spring member is in a third original state, when the pushing member is in the first position, and in a third deformed stated, when the pushing member is in the second position.

8. The computer bezel of claim 1, wherein the driving member comprises a pushing arm; and the pushing arm pushes a button of the disk drive to slide the tray out of or in the disk drive, when the pushing member is in the second position.

9. The computer bezel of claim 1, wherein a directing portion is located on the door; and the directing portion is in the through opening when the door is in the closed position, for directing force that the tray applies to the door.

10. A computer bezel comprising:
    a main body defining a through opening;
    a door rotatably secured to the main body, a first spring member located between the door and the main body, the first spring member is deformable between in a first original state, where the door covers the through opening, and a first deformed state, where the door is rotated away the main body to expose the through opening;

a pushing member slidably secured to the main body; and a driving member rotatably secured to the main body;

wherein the pushing member is slid between a first position, where the pushing member is disengaged from the driving member, and a second position, where the driving member is rotated by the pushing member; when the driving member is slid from the first position to the second position, the driving member is capable of sliding a tray of a disk drive out of the disk drive through the through opening and will push the cover that will move the first spring member from the first original state to the second deformed state.

11. The computer bezel of claim 10, wherein the pushing member comprises a first plate and a second plate located on the first plate; a latch portion is located on the first plate, and a locking portion is located on the second plate; and a position hole is defined in the main body to slidably receive the latch portion, and a positioning slot is defined in the main body to slidably receive the locking portion.

12. The computer bezel of claim 11, wherein the first plate is substantially perpendicular to the second plate.

13. The computer bezel of claim 10, wherein a second spring member is located between the pushing member and the main body; and the second spring member is in a second original state, when the pushing member is in the first position, and in a second deformed state, when the pushing member is in the second position.

14. The computer bezel of claim 10, wherein a pushing tab is located on the pushing member; a slanted portion is located on the driving member; and the pushing tab is disengaged from the slanted portion when the pushing member is in the first position, and the pushing tab engages the slanted portion when the pushing member is in the second position.

15. The computer bezel of claim 10, wherein a third spring member is located between the driving member and the main body; and the third spring member is in a third original state, when the pushing member is in the first position, and in a third deformed stated when the pushing member is in the second position.

16. The computer bezel of claim 10, wherein the driving member comprises a pushing arm; and the pushing arm pushes a button of the disk drive to slide the tray out of or in the disk drive, when the pushing member is in the second position.

17. The computer bezel of claim 10, wherein a directing portion is located on the door; the directing portion is in the through opening when the first spring member is in the original state, for directing force that the tray applies to the door.

* * * * *